July 3, 1956

H. ALTOSAAR 2,752,731

METHOD OF MAKING GLASS FILTERS

Filed Jan. 6, 1953

INVENTOR
HEINO ALTOSAAR

BY  *Alan Swabey*

ATTORNEY

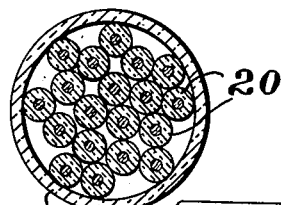
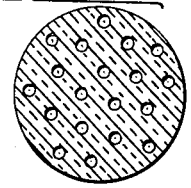
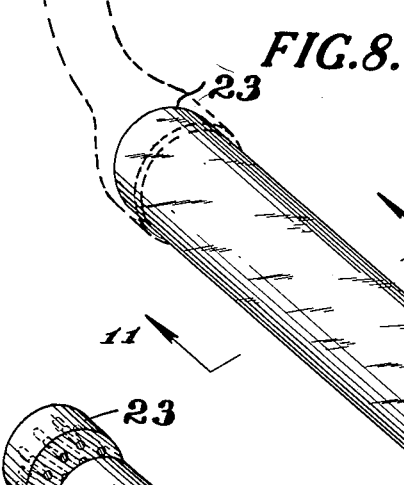
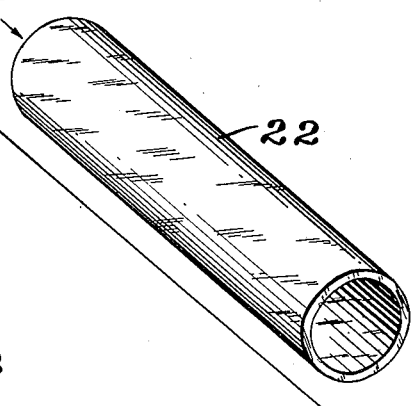
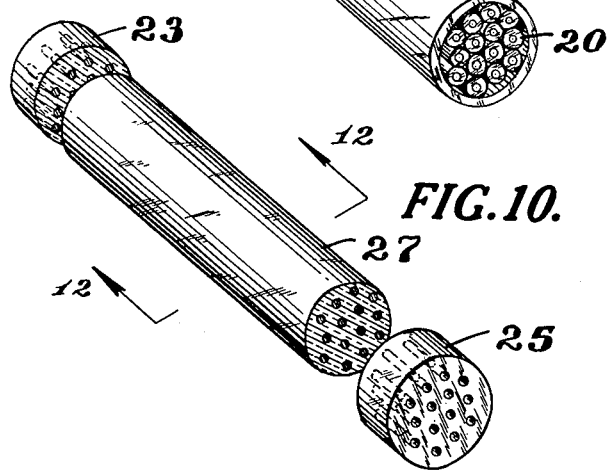
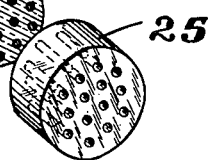

United States Patent Office 2,752,731
Patented July 3, 1956

2,752,731
METHOD OF MAKING GLASS FILTERS

Heino Altosaar, Magog, Quebec, Canada, assignor to Dominion Textile Company Limited, Montreal, Quebec, Canada, a corporation of Canada Application January 6, 1953, Serial No. 329,814

8 Claims. (Cl. 49—79)

The present invention relates to a method of making filters and more particularly to a method of making filters from glass particularly adapted for laboratory work.

Attempts have been made to provide chemically resistant filters by employing as a filter media packings or layers of fibrous silicon base material. For example, United States Patent No. 1,669,362, Watson, May 8, 1928, presents a filter plate made up of a mass of silica particles which are heated to a temperature at which adhesion occurs without complete fusion and then cooling the mass to retain it in that state. The resultant filter, therefore, has baffled openings between the grains making it sufficiently porous to permit gases and liquids to filter therethrough.

All of the known prior art devices of this nature have one common failing in that there is no control in the number of openings in the filter and secondly there is no provision for the control of the size of the openings which in turn controls the degree of porosity of the filter.

The present invention recognizes this problem and aims to provide a solution by furnishing a method of making a glass filter wherein the quantity and diameter of the openings may be controlled to give any required porosity to the filter.

Accordingly, the invention is a method of making a glass filter which comprises the steps of threading a metal wire through a glass capillary, heating and drawing the glass capillary over the wire so as to reduce the diameter of the glass capillary while increasing its length, cutting the glass coated wire into lengths, confining the glass coated wire lengths in a predetermined pattern and in juxtaposed axial alignment and fusing the glass coated wire lengths into a homogeneous mass and finally removing the wire cores by immersion of the homogeneous mass in an acid bath.

The glass covered wire is cut into lengths considerably greater than the desired thickness of the filter and after fusing is sliced into portions of the desired thickness of the filter before the wire cores are removed.

As will be appreciated, filters may be made by this method of any desired size and with any desired number of holes having any desired diameter. The only limitation to the size of holes is determined by the gauge of the wire used as the metallic core. For example, wire may be used running from the heaviest gauge down to the finest commercially available.

Detailed description

Having thus generally described the nature of the invention particular reference will be made to the accompanying drawings showing by way of illustrations preferred embodiments thereof, and in which:

Figure 8 is a diagrammatic exploded view showing an alternative method of producing a filter in accordance with the invention wherein a plurality of glass coated wire lengths are inserted in a hollow glass tube.

Figure 9 is a diagrammatic view in perspective showing the arrangement of the glass covered wire lengths as they would appear when inserted in a glass tube.

Figure 10 is a diagrammatic view in perspective of the assembly shown in Figure 9 as it would appear when fused into a homogeneous mass with the waste ends sliced off.

Figure 11 is a cross sectional view of the assembly shown in Figure 9 along the line 11—11.

Figure 12 is a cross sectional view of the homogeneous assembly shown in Figure 10 along the line 12—12 and also a view in perspective elevation of a slice removed from said assembly with the wires removed.

Figure 1:
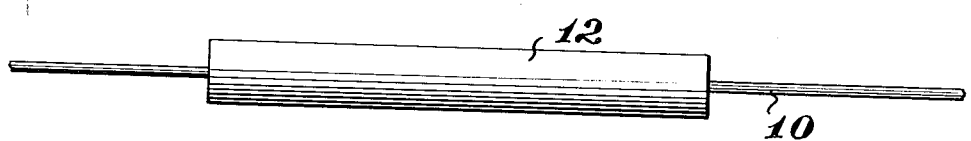
Figure 1 is a diagrammatic view of a portion of metallic wire as it would appear when initially threaded through a glass capillary.
Figure 2:
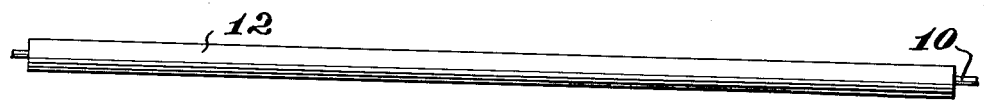
Figure 2 is a view of the glass capillary shown in Figure 1 as it would appear when heated and drawn to reduce the diameter thereof.

With particular reference to the drawings the steps outlining the present method are shown diagrammatically wherein Figure 1 illustrates a length of metallic wire as being threaded through a glass capillary 12. The glass capillary 12 is heated and drawn so as to reduce its diameter and at the same time is extended along the wire core 10. This method of glass coating wires is described and illustrated in detail in the applicant's co-pending United States application, Serial No. 329,815 filed January 6, 1953.

Essentially, the glass capillary 12 is threaded over a length of wire 10 and is, under application of heat, gradually and progressively attenuated over the wire core until the glass capillary is considerably lengthened and reduced in diameter while air is expelled from between the bore of the capillary and the wire core. In the present case the glass coated wire is then cut into equal portions of a length suitable for further processing.

Figure 3:
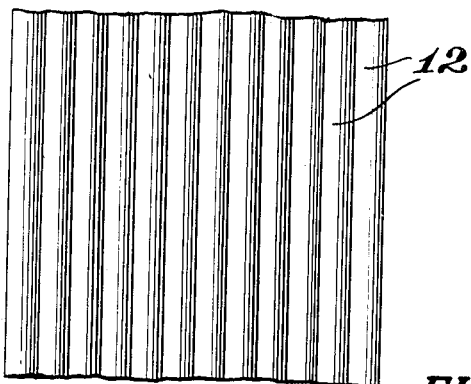
Figure 3 is a diagrammatic view of a plurality of glass covered wires prepared as shown in Figure 2 and arranged in juxtaposed parallel axial alignment.

The glass covered wire lengths so prepared are then aligned in juxtaposed axially parallel relationship as is shown in Figure 3, and are then arranged and confined in the desired shape and hole pattern required in the finished filter. The desired spacing between the holes in the finished filter depends on the thickness of the glass coating.

Figure 4:
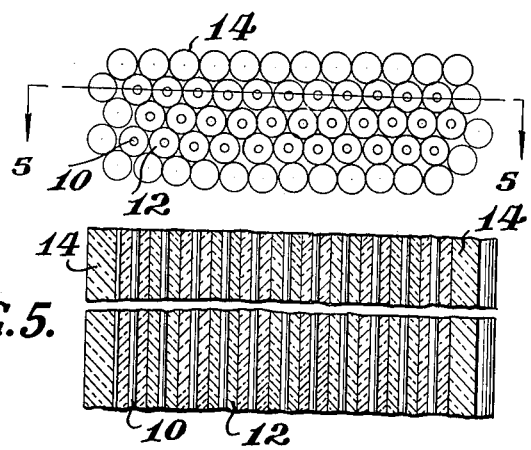
Figure 4 is a plan view of the aligned glass coated wires of Figure 3 surrounded by additional solid glass lengths of substantially the same diameter as the coated wires.
Figure 5:
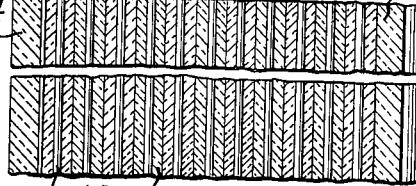
Figure 5 is a cross sectional view along the line 5—5 of the arrangement shown in Figure 4.
Figure 6:
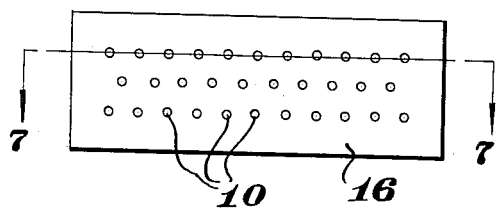
Figure 6 is a view in plan of the assembly of Figure 4 as it would appear when fused into a homogeneous block prior to the removal of the wires by immersion in an acid bath, the block having been confined to a substantial rectangular form during fusion.
Figure 7:
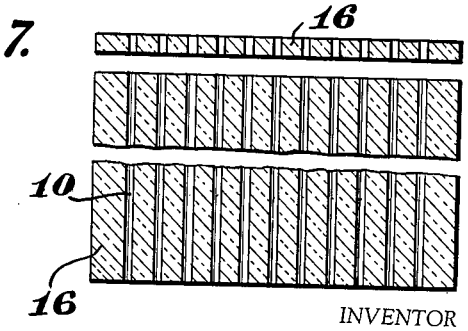
Figure 7 is a cross sectional view of the filter block shown in Figure 6 along the line 7—7 with a portion sliced off and the wires removed to show in more detail the parallel alignment of the openings formed by the removal of the coring wires.

In order to make a rectangular filter as is shown in Figures 6 and 7 supplementary lengths of solid glass rod of similar composition to the glass capillary 12 are arranged about the aligned glass covered wires shown in Figure 3. These supplementary glass rods 14 are also aligned axially as is shown in Figure 4.

The aligned glass rods 14 and glass coated wires 10 are then confined, in this case in a rectangular formation, and are subjected to sufficient heat to fuse the assembly into a homogeneous mass.

The homogeneous mass of glass and wire cores is then sliced transaxially of the wire cores into slices or portions having the desired thickness or depth required in the finished filter. The sliced off portion is then immersed in an acid bath reacting with the metal of the wires to form a soluble solution thereof so that the wires are dissolved leaving a glass block 16 having therethrough a plurality of spaced apart parallel openings having a diameter equal to that of the original wire core as shown in Figure 7.

Figure 8 illustrates an alternate step which can be employed to confine the glass covered wires in a circular formation for the making of circular filter discs. In this arrangement, a plurality of glass coated wires 20 prepared in accordance with the first steps mentioned are again arranged in parallel axial alignment and are inserted in a glass tube 22 having the internal and external diameters suitable for the size of filter desired. As is shown in Figure 9 the glass tube 22 is of greater length than the cut glass coated lengths 20 and these are arranged within the tube adjacent one end 25 so that an end portion 23 of the tube projects beyond the end of the wire lengths so as to provide a means of attaching a tube from a vacuum apparatus in readiness for the next step.

The next step is to subject the end 25 of the tube 22 and the ends of the glass coated wires 20 adjacent thereto to sufficient heat to fuse the end of the tube and wires into a homogeneous mass effectively sealing off the tube end. Then while vacuum is applied to the other end 23 of the tube 22 so as to withdraw air from between the axially aligned wire cores 20 and the inner surface of the tube 20, the tube and wire cores 20 therein are subjected to sufficient heat to fuse the glass tube 22 and the glass coating on the wires 20 into a homogeneous cylindrical mass, as shown in Figure 10. The end portions 25, 23 are then cut off leaving a solid glass rod 27 having embedded therein the wire cores 20. The glass rod 27 is then sliced transversely as before to any desired thickness to suit the filter required and these severed portions are immersed in an acid bath so as to dissolve the wire cores 20. In Figure 12, a slice 29 is shown perspectively and in plan as it would appear in the final step. These severed portions may be polished giving a highly transparent circular glass filter.

As will be obvious, the end product of this method produces a perforated filter plate particularly useful in laboratory work. Choice of the diameter of wire allows the holes in the plate to be made of any size. As an example, upon experiment it has been found that in making a filter disc the total area of the holes relative to the total area of the filter can be controlled to suit almost any degree of porosity required. The following chart gives an approximate area of the holes in relation to overall filter dimensions.

| Total Area of Holes Relative to Filter Area, Per cent | Wire Gauge Used AWG |
| --- | --- |
| 73 | No. 10 |
| 58 | No. 15 |
| 36 | No. 20 |
| 22 | No. 25 |
| 14 | No. 30 |
| 10 | No. 35 |
| 7 | No. 40 |
| 6 | No. 45 |
| 5 | No. 50 |
| 4.5 | No. 55 |
| 4.3 | No. 60 |

This means that using No. 10 gauge wire a filter can be made according to the invention having approximately 85 holes per sq. inch of filter surface and if 60 gauge wire is utilized, a filter may be made having approximately 230,000 holes per sq. inch.

As will be appreciated these figures are dependent on the glass coating 12 being reduced to the minimum possible diameter relative to the diameter of the wire core, or in other words the wire cores were aligned as closely as possible having regard to the combined diameters of the wire and the minimum to which the glass coating could be drawn exactly while maintaining a constant diameter.

As will be understood by the preceding description and accompanying drawings by the arrangement of the embedded wires any desired pattern of holes may be attained. By the use of good quality wire having standard gauges the diameter of the holes can be controlled within very fine limits. Accordingly, when a filter is required for a specific purpose wherein the actual flow must be predetermined within a given area a filter may be produced by the present method which can give the maximum of accuracy to the filter unit. This is a distinct advantage over the known prior art filters in that it has been practically impossible to produce a filter which could be calibrated to give a desired filter action in this manner. By the use of glass the filter is transparent and may be highly polished so as to provide a clean, chemical resistant, filter of a type superior to those presently available.

It will be appreciated that the filter arrangements shown in the drawings are by way of illustration only and are greatly enlarged with respect to the examples given and that in actual practice the size of the openings in the finished filter may be such that in a close pattern there may be 230,000 such openings per square inch.

I claim:

1. A method of making a glass filter comprising the steps of threading a metallic wire through a glass capillary, heating and drawing the glass capillary over the wire reducing the diameter of the glass capillary, cutting the glass covered wire into lengths, cutting portions of solid glass rod of a diameter substantially equal to the glass covered wire into lengths equivalent to the cut lengths of the glass covered wire, confining said glass covered wire lengths and glass rod lengths in a predetermined pattern and in juxtaposed axial parallel alignment, and subjecting the resultant assembly of glass rods and glass covered wire lengths to sufficiently high temperatures to melt the whole to a homogeneous mass, slicing said mass transaxially of said wire lengths and removing said wire by immersion of the sliced portion in an acid bath reactive with the metal of the wire to form a soluble salt thereof.

2. A method of making a glass filter as claimed in claim 1, including the additional step of polishing said filter.

3. A method of making a glass filter comprising the steps of threading a length of metallic wire through a glass capillary of lesser length than said wire, heating and drawing the glass capillary along the wire to reduce the diameter of the glass capillary, cutting the glass coated wire into substantially equal lengths, placing the cut lengths of glass coated wire in juxtaposed axial parallel alignment and surrounding said aligned lengths of glass coated wire with corresponding lengths of solid glass rod and confining said glass covered wire lengths and solid glass lengths in a predetermined pattern, subjecting the confined glass coated wire lengths and glass rod lengths to sufficiently high temperatures to melt the whole into a homogeneous mass, severing said homogeneous mass transversely of the axes of said wire lengths into portions equal to the desired thickness of the filter and removing said wire by immersion of the severed portions in an acid bath reactive with the metal of the wire to form a soluble salt thereof.

4. A method of making a glass filter as claimed in claim 3 including the additional step of polishing said severed portions.

5. A method of making a glass filter comprising the steps of threading a length of metallic wire through a glass capillary of lesser length than said wire, heating and drawing the glass capillary along the wire to reduce the diameter of the glass capillary, cutting the glass coated wire into substantially equal lengths, inserting the cut lengths of glass coated wire in juxtaposed axial parallel alignment within a hollow glass tube having internal and external dimensions corresponding to the desired size of the filter and of substantially equal length to the cut wire lengths, subjecting the combined glass tube and glass coated wire lengths to sufficiently high temperatures to melt the whole into a homogeneous mass, severing said homogeneous mass transversely of the axes of said wire lengths and tube into portions equal to the desired thickness of the filter, and removing said wire by immersion of the severed portions in an acid bath reactive with the metal of the wire to form a soluble salt thereof.

6. A method of making a glass filter as claimed in claim 5 including the additional step of polishing said severed portions.

7. A method of making a glass filter comprising the steps of threading a length of metallic wire through a glass capillary of lesser length than said wire, heating and drawing the glass capillary along the wire to reduce the diameter of the glass capillary, cutting the glass coated wire into substantially equal lengths, inserting the cut lengths of glass coated wire in juxtaposed axial parallel alignment within a hollow glass tube having internal and external dimensions corresponding to the desired size of the filter and of substantially greater length than the cut wire lengths, subjecting the combined glass tube and glass coated wire lengths to sufficiently high temperatures to melt the whole into a homogeneous mass while applying vacuum to one end of said glass tube to withdraw air from between said glass coated wire lengths and the inner surfaces of said glass tube, severing the homogeneous mass so produced transversely of the axis of said wire lengths into portions equal to the desired thickness of the filter, and removing said wire by immersion of the severed portions in an acid bath reactive with the metal of the wire to form a soluble salt thereof.

8. A method of making a glass filter as claimed in claim 7, including the additional step of polishing said severed portions.

References Cited in the file of this patent

UNITED STATES PATENTS

| | | |
|---|---|---|
| 2,143,907 | Blumlein et al. | Jan. 17, 1939 |
| 2,306,986 | Tolman | Dec. 29, 1942 |
| 2,328,302 | Simison | Aug. 31, 1943 |
| 2,354,931 | Tolman | Aug. 1, 1944 |
| 2,433,271 | Grant | Dec. 23, 1947 |

FOREIGN PATENTS

| | | |
|---|---|---|
| 507,711 | France | July 2, 1920 |